(12) United States Patent
Bradley

(10) Patent No.: US 7,011,041 B1
(45) Date of Patent: Mar. 14, 2006

(54) SELF CLEANING BIRDBATH

(76) Inventor: Michael Thomas Bradley, 1333 14th. St., Orange City, FL (US) 32763

(*) Notice: Subject to any disclaimer, the term of this patent is extended or adjusted under 35 U.S.C. 154(b) by 0 days.

(21) Appl. No.: 10/922,292

(22) Filed: Aug. 20, 2004

(51) Int. Cl.
*A01K 39/012* (2006.01)

(52) U.S. Cl. ........................................ 119/69.5; 119/72
(58) Field of Classification Search ............... 119/69.5, 119/72, 74
See application file for complete search history.

(56) References Cited

U.S. PATENT DOCUMENTS

| | | | | |
|---|---|---|---|---|
| 2,878,781 | A * | 3/1959 | Wingfield | 119/72 |
| 3,696,786 | A * | 10/1972 | Garwood | 119/69.5 |
| 3,995,591 | A * | 12/1976 | Garwood | 119/69.5 |
| 4,476,813 | A * | 10/1984 | Haiges | 119/75 |
| 4,630,569 | A * | 12/1986 | Dieleman | 119/69.5 |
| 5,784,998 | A * | 7/1998 | Manzer | 119/69.5 |
| 6,634,316 | B1 * | 10/2003 | Desatoff | 119/69.5 |
| 6,640,747 | B1 * | 11/2003 | Reusche | 119/69.5 |
| 6,647,922 | B1 * | 11/2003 | Travis | 119/69.5 |
| 6,684,813 | B1 * | 2/2004 | Lemon | 119/69.5 |
| 6,799,533 | B1 * | 10/2004 | Flowers et al. | 119/69.5 |
| 6,802,458 | B1 * | 10/2004 | Gregory | 239/205 |

* cited by examiner

*Primary Examiner*—Peter M. Poon
*Assistant Examiner*—David Parsley
(74) *Attorney, Agent, or Firm*—Terry M. Sanks, Esq.; Beusse Brownlee Wolter Mora & Maire, P.A.

(57) ABSTRACT

A self cleaning birdbath with a bowl (10) which is shaped for easy cleaning and fixed to a support pole (14) that has a water supply pipe (13) inside it, connected to a gear driven lawn sprinkler (12) with a converter nozzle (11), that will produce a cleaning water jet (15) aimed downward into the bowl (10) which quickly empties the bowl (10) then the cleaning water jet (15) strikes the water holding surface of the bowl (10) directly and pressure washes it, the entire water holding surface of the bowl (10) is cleaned as the gear driven lawn sprinkler (12) rotates a full 360 degrees for as long as is needed for satisfactory cleaning. When the cleaning is done the water pressure is reduced so the water coming from the converter nozzle (11) will not have enough inertia to go over the rim, the bowl (10) will refill until the water is turned off.

16 Claims, 2 Drawing Sheets

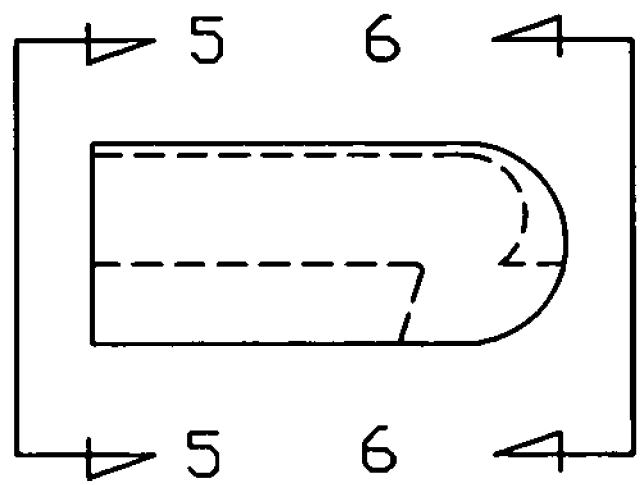
Fig.4
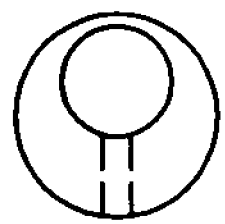 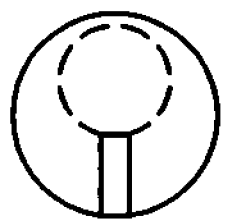
Fig.5  Fig.6

SELF CLEANING BIRDBATH

BACKGROUND OF THE INVENTION

This invention relates to birdbath and animal watering devices such as used for practical and decorative purposes, and in particular to a self cleaning and refilling apparatus.

There are many types of birdbaths, most a simple bowl on a mounting pole, with physical stability, and perhaps good looks being the only requirements. They are usually dirty and dry. If water is in the birdbath it is usually dirty, unsanitary, breading mosquitoes, and bacteria. Few owners have the time and put out the effort to keep them clean and filled with fresh clean water for the birds and animals.

Inventors created self cleaning birdbaths. U.S. Pat. No. 3,696,786 to Garwood (1972) is described as "A self cleaning bird bath" but in fact only emptied itself of dirty water, if water from some outside source is provided. It would only be refilled and left full if after it righted itself at the end of the emptying cycle the unknown water source then filled it, stopping before causing the bowl to empty itself again. There was no cleaning action what so ever and no guarantee that the bowl would contain any water if operated by rain. If it were manually filled to cause emptying to occur and then filled, rain could still cause unwanted operation ending up empty. The bowl had internal channels with ports to the inside and underneath to the counter balance bucket. It also had a pivot assembly and actuation arm attachment points. The counter balance bucket with holes had to be matched to over balance the asymmetrically weighted bowl when full but not when empty. All these parts made the design expensive to make. This design has no freeze damage protection.

Mr. Garwood's next version U.S. Pat. No. 3,995,591 resolved the problems of unreliable action by using water under pressure delivered by pipe or hose to actuate the cleaning and filling cycle. There was still no cleaning action, just emptying the water and refilling the bowl. This unit was even more expensive to make. It used a hydraulic piston and cylinder to operate the emptying of the bowl. Water pressure would have to be regulated for proper function unless manually adjusted for emptying and filling. This design has no freeze damage protection.

Then came U.S. Pat. No. 4,630,569 to Dieleman in 1986. This self cleaning birdbath is operated by water under pressure delivered by an underground pipe and provides a means of automatic operation and a little cleaning action. Cleaning is accomplished by filling the bowl with water at a pressure not sufficient to carry the water out of the bowl. Then water at that pressure continues to agitate the full bowl of water to clean the bowl. The indicated level of agitation of a full bowl of water does not get it very clean. A film of scum will easily stay behind after the cleaning stage. When the pressure is increased to empty the bowl the water is sprayed up and out in a cone, carrying with it the dirty water in the bowl from the cleaning stage, coming down beyond the rim and outside of the bowl. The main force of the sprayed cone does not directly strike the surface of the bowl. Some collateral spray mist that falls on some part of the surface of the bowl drains back to the center and is carried out with the spray as it is leaving the nozzle. Because the nozzle is fully raised at this point there will be water from the agitation cycle in the bottom of the bowl up to the level of the nozzle in its raised position. When the cleaning cycle is done the bowl will drain itself if there is any small leak anywhere in the plumbing system or joints between the bowl and sprinkler assembly. This sealing requirement has to stand up to an animal's weight that would be applied to one edge of the bowl by putting the fore feet on it while taking a drink. The required seals and leak proof fittings between all parts, including moving parts, make this design expensive to make and somewhat unreliable too. The fact that the sprinkler assembly, the adapter collar, and the bowl must be assembled and installed water tight, makes assembly and installation less than user friendly for the average person. This system is somewhat pressure sensitive because the return spring in the rising spray nozzle operates at a specific pressure. This system works best with regulation that is incorporated into the design and adds to the cost and complexity of the system, and it's installation. This system has no protection against freeze damage other than to manually shut off the water and drain the pipes making the system inoperable.

SUMMARY OF THE INVENTION

Several objectives and advantages of the present invention are:
(a) to provide a birdbath that is as clean as is possible without the use of a chemical cleaner;
(b) to provide a birdbath that has very few precision parts and is therefore easy and inexpensive to make;
(c) to provide a birdbath that can be easily made from the same materials and processes commonly used in regular birdbath production.
(d) to provide a birdbath that is easy to assemble and setup;
(e) to provide a birdbath that will not leak;
(f) to provide a birdbath that will not suffer damage if water freezes solid in the bowl.

BRIEF DESCRIPTION OF THE DRAWINGS

FIG. 4 is a cross section of the conversion nozzle.

FIG. 5 is the nozzle end the water enters.

FIG. 6 is the nozzle end the water sprays from.

REFERENCE NUMBERS IN DRAWINGS

10 Bowl
11 Converter Nozzle
12 Gear Driven Lawn Sprinkler (shown in it's up position and spraying water)
13 Water Supply Pipe
14 Support Pole
15 Cleaning Water Jet

DETAILED DESCRIPTION OF THE INVENTION

Figure 1:
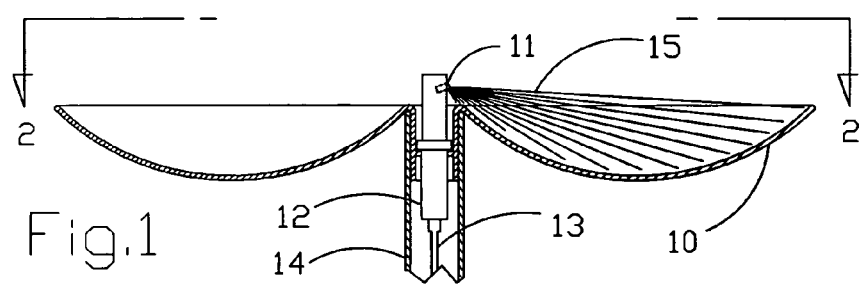
FIG. 1 is a cross section side view of a complete birdbath assembly including a pole, water supply pipe, a gear driven, rotating, lawn sprinkler and converter nozzle. The water is shown in the "fan" the converter nozzle shapes it into.
Figure 2:
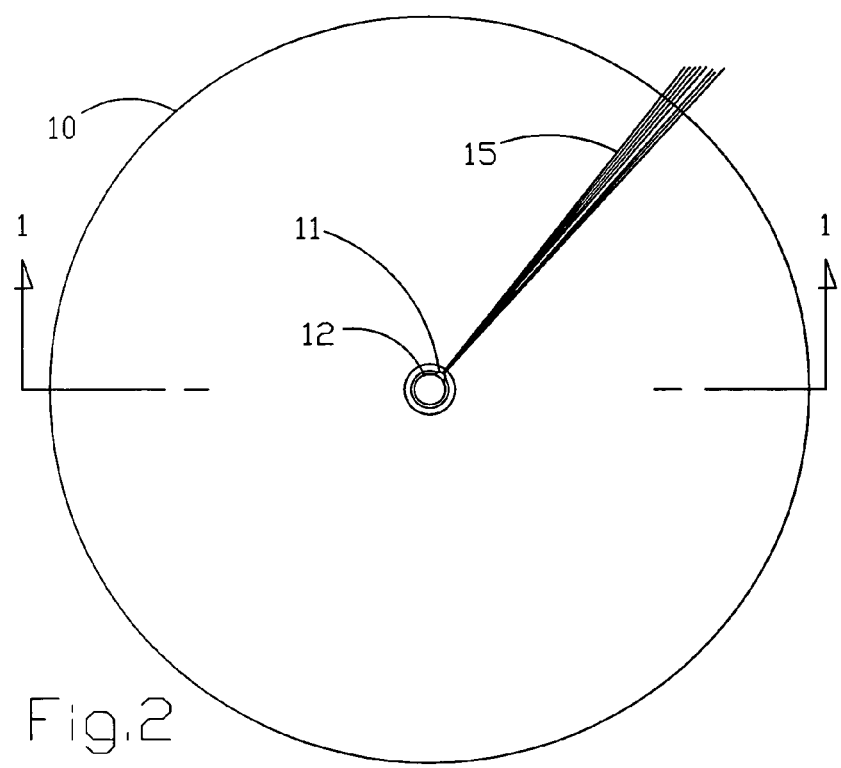
FIG. 2 is a top view of the same assembly above, with no hidden lines shown.
Figure 3:
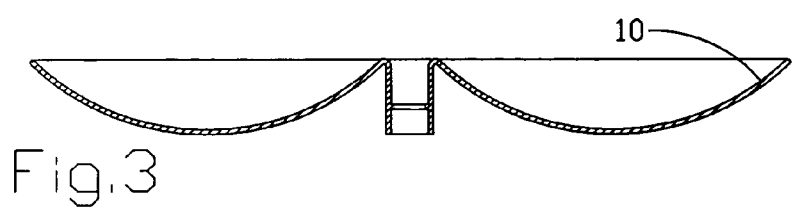
FIG. 3 is a cross section side view of the bowl only.

A preferred embodiment of the self cleaning birdbath is shown in FIG. 1, it looks like the classic and or traditional birdbath. It consists of a bowl 10 which is shaped for easy cleaning and fixed into a fitting support pole 14 that has a water supply pipe 13 inside it, which is connected to a gear driven lawn sprinkler 12 that has had it's nozzle replaced with a converter nozzle 11, and it's retracting spring removed. When water is turned on full force the converter nozzle 111 will produce a cleaning water jet 15 aimed downward into the bowl which quickly empties the bowl by pushing the contents over the outer rim of the bowl 10. Once the bowl 10 is empty the cleaning water jet 15 strikes the water holding surface of the bowl 10 directly and pressure washes it, the entire water holding surface of the bowl 10 is cleaned as the gear driven lawn sprinkler 12 rotates a full 360 degrees for as long as is needed for satisfactory cleaning. When the cleaning is done the water pressure is reduced so the water coming from the converter nozzle 11 will not have enough inertia to go over the rim, the bowl (10) will refill until the water is turned off.

OTHER EMBODIMENTS AND VARIATIONS AND CONSIDERATIONS

A ceramic bowl is a preferred choice because of its smooth impervious surface, which improves the cleaning efficiency. A plastic, plaster, metal, or concrete bowl would be cheaper to produce. A satisfactory bowl could be made with the same materials, techniques, and equipment used to produce most birdbaths. The diameter, depth, and shape of the curved bottom can be adjusted to change the volume of water held when full and how far from the bowl the water will land in the cleaning cycle. A shallow bowl is easier and quicker to clean. A smaller bowl is easier and quicker to clean.

The water cycle is: Full on for a few minutes until the bowl is clean, then the pressure is reduced and allowed to run until the bowl is full and then off. How long it takes to get the bowl clean depends on the water pressure, size of the bowl, shape of the bowl, surface finish of the bowl, and frequency of cleaning. Water can be controlled manually, by timers and valves like those found in dishwashers and washing machines, or most simply by lawn sprinkler controllers and valves yielding a fully automatic system.

Instead of a 360 degree round bowl shown here a bowl could be say 80 degrees and shaped like a sea shell or 35 degrees and shaped like a big teaspoon with the cleaning jet at the handle position so the gear driven lawn sprinkler would only cover 35 degrees oscillating back and forth. This would keep the cleaning water jet over spray restricted to one general direction instead of all around the bowl. A scattered spray from a garden hose sprayer with no movement could clean and refill a narrower spoon shaped bowl, a cheap simple version as might be used to water animals.

The converter nozzle when fully seated and held by the set screw in the sprinkler head extends out of the sprinkler head past flush. This allows a converter nozzle to spray straight down or as nearly straight down as needed. This allows the center hole in the bowl in the preferred embodiment shown to be small, just large enough to allow the gear driven sprinkler to fit inside.

The retracting spring is removed from the gear driven lawn sprinkler. This guarantees that when the water pressure is reduced to refill the bowl the gear driven lawn sprinkler will not retract. If allowed to retract the extended converter nozzle would cause the head to bind and pull to one side when it hit the side of the body. This would lead to unreliable operation.

A converter nozzle that fits inside the sprinkler head as standard nozzles do could be made. The center hole in the bowl would have to be larger as the down angle of the cleaning jet would be limited. With the standard or a modified spring in place the sprinkler head could be retracted. It would be more difficult to set up and adjust; regulated water pressure might be needed.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

I claim:

1. A self cleaning bowl system for use on a birdbath or feeding tray wherein said bowl holds a liquid, said system comprising:
   a) a bowl having an inner surface, an outer elevated edge and an inner elevated edge adjacent to a hole formed therethrough a center of said bowl;
   b) a support pole attached to said hole in said bowl elevating said bowl above a ground surface and holding said bowl in a fixed position;
   c) a 360 degree automatically rotatable downward spraying nozzle attached through said hole and above said inner elevated edge;
   d) a hose connected to said downward spraying nozzle for a liquid to pass therethrough; and
   e) wherein said downward spraying nozzle propels liquid from said nozzle downward to strike said inner surface of said bowl which in turn pressure washes a section of said inner surface, from said inner elevated edge to said outer elevated edge, in line with said nozzle as said nozzle rotates.

2. The system of claim 1 wherein said liquid striking said inner surface moves at a rate equal to a rate that said nozzle rotates.

3. The system of claim 1 wherein said bowl comprises a portion of a toroidal with a hole at a center of said toroidal where said inner elevated edge is disposed around said hole.

4. The system of claim 1, wherein said nozzle is operable to dispense said liquid at a force causing said liquid to flow over said outer elevated edge of said bowl.

5. The system of claim 1 wherein said nozzle is positioned at a downward position to allow said liquid to contact near said inner surface of said inner elevated edge.

6. The system of claim 1 wherein said nozzle dispenses said liquid in at least one of a downward vertical and a nearly downward vertical direction against said inner surface of said bowl.

7. The system of claim 1 wherein said nozzle comprises a gear driven lawn sprinkler assembly having a converter nozzle and no retracting spring.

8. The system of claim 1 further comprising an automatic controller to activate when said liquid is applied and when said nozzle is activated.

9. The system of claim 1 wherein said liquid comprises at least one of water and a cleaning solution.

10. The system of claim 1 wherein said system is used for a birdbath.

11. A self cleaning bowl system for use on a birdbath or feeding tray said system comprising:
   a) a bowl having a shape formed by a rounded outer elevated edge having a first end and a second end, an inner elevated edge with a length shorter than said outer elevated edge and having a first end and a second end; a focal point above said inner elevated edge; a first side elevated edge connecting said first end of said outer elevated edge and said first end of said inner elevated edge and a second side elevated edge connecting said second end of said outer elevated edge and said second end of said inner elevated edge to collectively contain a liquid;
b) an automatically rotatable about its axis downward spraying nozzle attached to said focal point and above said inner elevated edge operable to rotate from said first side elevated edge to said second side elevated edge and dispense a liquid from said nozzle as said nozzle rotates;
c) a hose connected to said downward spraying nozzle for a liquid to pass therethrough; and
d) wherein said downward spraying nozzle propels a stream of liquid from said nozzle downward to strike said inner surface of said bowl which in turn pressure washes a section of said inner surface, from said inner elevated edge to said outer elevated edge, in line with said nozzle as said nozzle rotates.

12. The system of claim 11 wherein said nozzle is operable to dispense said liquid at a force causing said liquid to flow over said outer elevated edge of said bowl.

13. The system of claim 11 wherein said nozzle comprises a gear driven lawn sprinkler assembly having a converter nozzle and no retracting spring.

14. The system of claim 11 further comprising an automatic controller to activate when said liquid is applied and when said nozzle is activated.

15. The system of claim 11 wherein said liquid comprises at least one of water and a cleaning solution.

16. The system of claim 11 wherein said system is used for a birdbath.

* * * * *